United States Patent [19]

Lockhart, Jr. et al.

[11] 4,247,908
[45] Jan. 27, 1981

[54] RE-LINKED PORTABLE DATA TERMINAL CONTROLLER SYSTEM

[75] Inventors: Robert K. Lockhart, Jr., Lauderhill; William J. Macko, Tamarac; Robert H. Bass, Sunrise; Craig S. Wallace, Coral Springs; Morris A. Moore, Sunrise, all of Fla.

[73] Assignee: Motorola, Inc., Schaumburg, Ill.

[21] Appl. No.: 967,805

[22] Filed: Dec. 8, 1978

[51] Int. Cl.[3] .............................................. G06F 3/04
[52] U.S. Cl. .................................... 364/900; 455/31
[58] Field of Search .......................................... 325/55; 364/200 MS File, 900 MS File

[56] References Cited

U.S. PATENT DOCUMENTS

| 3,281,789 | 10/1966 | Willcox et al. | 364/900 X |
| 3,314,051 | 4/1967 | Willcox et al. | 325/55 |
| 3,568,161 | 9/1968 | Knickel | 364/900 |
| 3,651,471 | 3/1972 | Haselwood | 364/900 |
| 3,678,391 | 7/1972 | Gough | 325/55 |
| 3,801,956 | 4/1974 | Braun et al. | 340/146.2 |
| 3,848,233 | 11/1974 | Lotan et al. | 364/200 |
| 3,855,576 | 12/1974 | Braun et al. | 340/146.2 |
| 3,858,212 | 12/1974 | Tompkins | 325/55 |
| 4,059,736 | 11/1977 | Perucca et al. | 364/200 |
| 4,085,449 | 4/1978 | Walsh | 364/200 |
| 4,138,735 | 2/1979 | Allocca et al. | 364/900 |

OTHER PUBLICATIONS

IBM System/360 (928-21), 3/18/70, pp. 5-14 and 19-20.
Principles of Operation, IBM System/370, 12/70, pp. 4-7 with front and back pages.

Primary Examiner—Harvey E. Springborn
Attorney, Agent, or Firm—Margaret Marsh Parker; James W. Gillman

[57] ABSTRACT

A two-way communications system for use with a host computer includes a control unit, a base station and multiple radio/data terminal units. The control unit interfaces directly with the computer but uses a radio link to the portable units. Voice and data signals can be transmitted and data between units is decoded, sorted, stored, encoded, and sent to its destination in accordance with predetermined protocol in queue discipline. An extensive self-diagnostic system is included. An active redundancy arrangement switches between two control units/base stations on a regular schedule if both units are up, and instantaneously if the "on" unit goes down.

12 Claims, 11 Drawing Figures

RE-LINKED PORTABLE DATA TERMINAL CONTROLLER SYSTEM

BACKGROUND OF THE INVENTION

This invention relates to the field of two way voice and data communication, and more particularly, to the control of transmission between a multiplicity of portable radio/data terminal units and a large host computer.

There are known applications using large computers with interfacing units to control many data input terminals. One such is used on a large factory assembly line where products on the line may require special components, and data regarding the individual orders is stored in a host computer. As the product units move down the line, an operator can go to a data terminal, usually of the CRT display type, and query the computer as to the requirements for a particular product unit. The computer will, of course, come back with the appropriate information almost immediately, but the operator must then return to the unit which is moving down the line and carry out the instructions given him. Another disadvantage of this system is that each data terminal is polled in a fixed sequence for data to be sent to the host computer. After each unit is polled, the control unit waits a few seconds for a response. Since one control unit can be connected to as many as 32 data terminals, there can be a perceptible delay in the receipt of the desired response back from the host computer. An added disadvantage is that each data terminal requires a television type coaxial cable.

While such a system is usable in a factory, even with the obvious handicaps, it becomes completely impractical for an application such as a ship yard or train yard where mobility as well as instant two-way communication with the host computer is essential, and communication between data terminals is desirable.

In another application involving the use of multiple paging units and a transmitter, each pager is assigned a unique two-word binary coded address. In U.S. Pat. Nos. 3,801,956 and 3,855,576 assigned to the same assignee as is the present invention, a system is shown for detecting the pager address asynchronously and for detecting the combinations of the address words and their complements. There is no two-way communication, the pager user merely being alerted to one or more actions to be taken.

SUMMARY OF THE INVENTION

It is therefore an object of the present invention to provide a system for two-way communication between a multiplicity of portable radio-data terminals and a host computer.

It is a particular object to provide for interface capabilities which can decode, store, encode and send on information in a minimal amount of time and with maximum channel efficiency.

It is another object to provide a system with improved self-diagnostic capabilities.

It is still another object to provide the system with active redundancy capability.

These objects and others which will become apparent are provided by a system which couples at least one control unit and base station combination to a host computer. The base station provides two-way communication between the control unit and any of a number of portable radio-data terminals. The control unit functions to decode received messages, store them in memory, encode them for transmission to the appropriate unit at the appropriate time, and perform many other control functions. The control unit communicates with each other unit in the appropriate language, and at the appropriate rate. in the memory of the control unit, the portable units are listed in a queue which, in addition to their address codes (one used by the host and one by the portable unit itself) and the status of the unit (as active or inactive), includes any messages received from or to be sent to the portable unit. All active units are polled for data in each polling sequence, along with some of the inactive units, and the sequence is interrupted at each response. Messages not requiring an immediate response are transmitted at the end of each polling sequence. There is also the capability for portable-to-portable transmission, independent of the host computer. With the use of the second control unit and base station, a redundant system is provided which switches operation from one pair to the other, automatically at set intervals with a smooth change over and, in case of loss of function in the operating unit, an immediate switchover.

BRIEF DESCRIPTION OF THE DRAWINGS

FIG. 3 is a flow chart for the transmission of data from the computer to portable units.

DETAILED DESCRIPTION OF A PREFERRED EMBODIMENT

General Description

Figure 1:
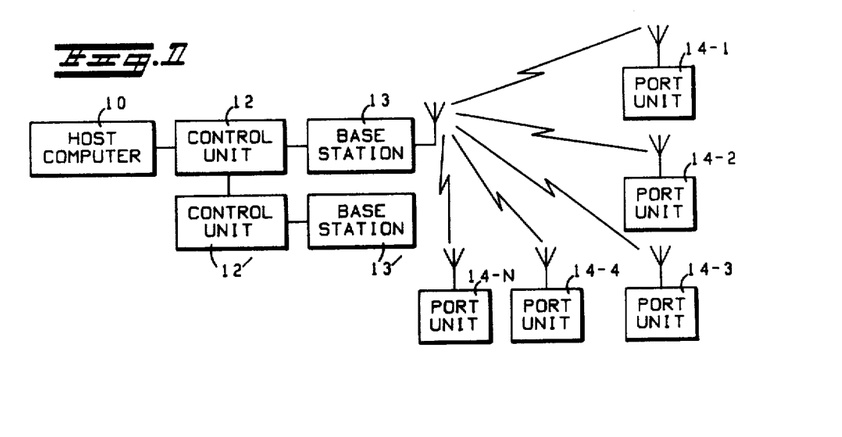
FIG. 1 is a diagram showing a complete system such as could utilize the present invention.

The system as shown in FIG. 1 includes a large or "host" computer 10, control units 12 and 12', base stations 13 and 13' and a number (n) of portable radio/data terminals 14 (five are shown).

The host computer 10 may be any one of a number of large computers; one example being an IBM 360/370 system (or any other similar system) using IBM-type bisynchronous protocol. The computer may be coupled directly to the control unit 12 by a cable via a standard RS 232 which may be a Motorola MC1488 connector if the distance between units is not more than 50 feet (and the controlled atmosphere of a computer room would be an ideal ambience for the control unit). If it is necessary or desirable, the control unit 12 may be located at any suitable location and coupled to the host computer 10 through modems. The interconnection must be a bisynchronous land line link. The base station 13 includes an FM transceiver and antenna, with minor additions as will be discussed hereinafter with respect to FIG. 10. The base station 13 is connected to the control unit 12 by four shielded, twisted pairs of wires, with a maximum length of one mile (1.6 Km). Preferably the radio link operates in the UHF band and transmits data at the rate of 1200 bits per second (80 characters per second). The code used is ASCII (American Standard Code for Information Interchange). As required by the FCC, an automatic audio ID signal, provided by a magnetic tape recorder, is transmitted at 15 minute intervals.

To provide active redundancy capability, a second control unit 10' and base station 12' combination is used, with only a three-wire cable required between control units. Contact is maintained between control units and each knows that status of the other pair. At set intervals, the controlled switchover takes place wherein the "on" unit stops receiving messages, finishes transferring all stored messages and, if the off unit is operative, goes to the inactive mode, while the other unit goes on. If at any time during its on period, a unit or its base station experiences a failure, the off unit comes on immediately. If, at the end of its own on period, a unit is aware of a failure in the inactive unit, the active unit stays on. Alarms and indicators will be discussed hereinafter with respect to FIG. 7.

Each portable unit 14 is a hand-held unit including a two-way radio, similar to those used in public safety work, plus a data terminal. The data terminal includes a keyboard for data entry and an LED display for a readout of either received data or locally generated data. A speaker/microphone assembly is included and the control unit and base station can support audio as well as data transmission between portable units if desired.

General Operation of Host Computer/Control Unit

The host computer 10 initiates communication through polling and/or selection of portable units via the control unit 12 (or 12'). The control unit, in response to a "poll" from the host computer, answers by sending either a previously received message from a portable unit or, if no message has been received, a "no message" response. The control unit, in response to a "select" request from the host computer, accepts data from the host computer and eventually sends the data to the desired portable unit. The host computer-control unit link can use either ASCII or EBCDIC coding with only a jumper change in the control unit 12. The transmission of information between the host computer 10 and the control unit 12 is a part of the prior art, thus it will be explained only to the extent that it affects the remainder of the system.

One of three operations occurs when the control unit 12 receives the poll sequence. First, if the control unit address is not a correct address, the control unit does nothing. (Remember that there may be a number of active control units in one system.) Second, if the host computer sends the correct control unit address and a correct portable unit address, and there is no stored data from that portable unit, the control unit sends an end of transmission signal back to the host computer. Third, if the control unit has any stored data from that portable unit, the control unit sends the host computer a data block following the computer protocol. The data to be sent is contained within a text block (256 bytes of information, maximum). If all of the data has been included, the control unit sends an "end of text" signal which means that the host computer has now received all of the data that was fed into the control unit from that portable unit. If there is more data to come, an "end of text block" signal is sent. To ensure that the data was received correctly, the control unit sends a block check character, the value of which depends upon the data sent previously. An acknowledge signal is sent back by the computer immediately if the message was received correctly.

If there was an error, the host computer sends a negative acknowledgement signal causing the control unit to resend the message. If an end of block signal was sent and the data was acknowledged, the control unit immediately sends the next transmission block in essentially the same manner as the first block of text and so on until the complete message has been relayed whereupon it sends an end of text signal. Similar operations occur when the host computer sends messages to the control unit for eventual transmission to specified portable units.

One of three operations occurs when the control unit 12 receives a "select" sequence. First, if the control unit address is not a correct address, the control unit does nothing. Second, if the control unit does not want the host computer to send a message, the control unit sends a wait/acknowledge signal. The host computer acknowledges the control unit by sending an end of text signal. Third, if the control unit can accept data from the host computer, the control unit sends an acknowledge signal to the host computer, and the host computer sends the message.

After all of the data for one portable unit has been sent, the host computer then sends an end of text signal. To ensure that the data was received correctly the host computer sends a block check character the value of which depends upon the data sent previously.

One of four conditions exists when the host computer 10 sends data to the control unit 12. If there is no response, the host computer takes action to find out why there was no response. Second, if there was an error, the control unit sends a negative acknowledgement, causing the host computer to resend the message until the host computer receives an acknowledge signal from the control unit. The host computer eventually send a signal indicating an operation is terminated. Third, if the control unit receives invalid data that it cannot act upon, the control unit sends a signal to the host computer to terminate transmission of the message. Fourth, if the control unit received the data correctly, the control unit sends an acknowledge signal to signify its acceptance of the host computer data. Following this the host computer either indicates a termination of operation or sends more data to the control unit.

Control Unit/Portable Unit

Figure 2:
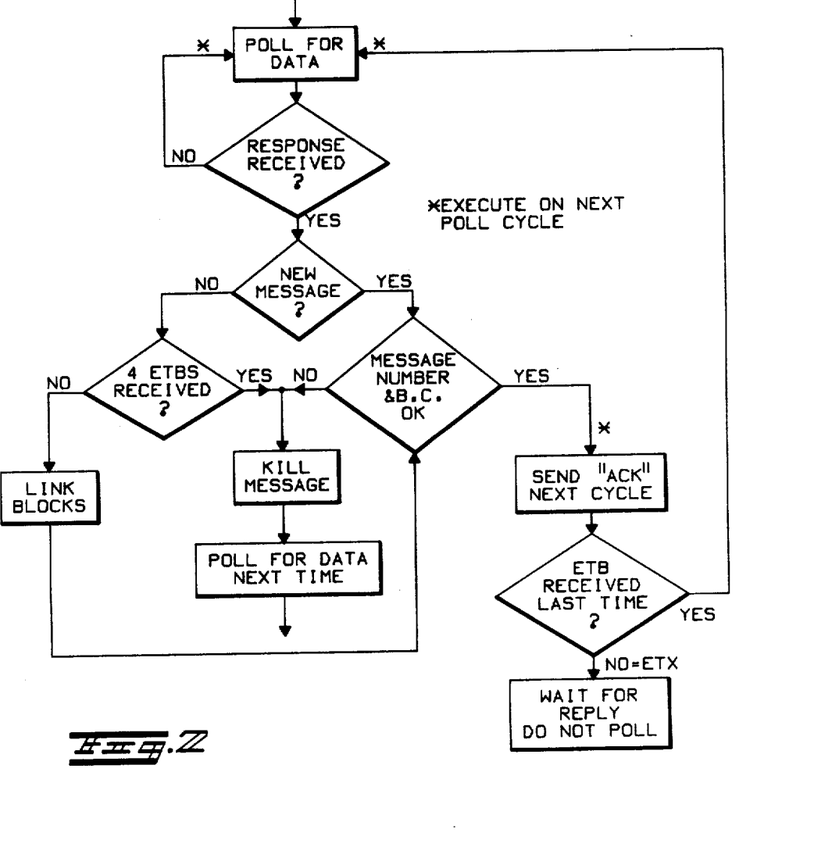
FIG. 2 is a flow chart of the polling-for-data sequence from control unit to portable units.

Polling by the control unit 12 is an invitation to the portable units to send data to the control unit to be stored, grouped if necessary and sent on to the host computer 10. FIG. 2 depicts the message processing for polling which differs from the host polling as described above. The control unit 12 accepts no more than one block of data (256 bytes) from any one portable unit in each polling cycle. If the message put into the portable unit is longer than one block of data, another block is sent to the control unit on the next cycle. The control unit stores the blocks (up to four) and sends them on to the host computer 10 after it has received and checked the complete message. The control unit polls portable units in a particular sequence. This sequence is to some extent a function of the current status of each portable unit and is described more fully in a co-pending application, Ser. No. 968,066.

If one portable unit has no data to be sent on to the host computer, the control unit continues polling the other portable units and, in fact, begins sending the address code of a second portable unit while listening for a response from the first unit. If the control unit receives a response, it interrupts the polling sequence and determines the type of response received. If data is received, a decision is made as to whether the data is a new message or another block of data from a message previously sent. If the data from the portable unit begins a new message, and if the block check character checks, the control unit sends an acknowledge signal back to the portable unit on the next polling cycle. This acknowledges that the data from the portable unit has been read into the control unit and has been placed in the host queue.

If the new message was longer than 256 bytes, an end of text block signal (ETB) is sent instead of an end of text signal (ETX). "ETB" signals to the control unit that there is more data of the same message still to be transmitted. The portable unit then waits for a poll-for-data on the next poll cycle. The control unit again receives a response from the portable unit. Since this is not a new message as indicated by the previous ETB signal, the control unit determines whether this is the first, second, third or fourth ETB. If this is the first, second or third ETB, the control unit adds the second, third or fourth block of data to the message previously sent. If the message number and blockcheck character are correct for the second, third or fourth message, on the next polling cycle the control unit acknowledges that the message was received correctly.

The control unit 12 polls for data from the same portable unit on each polling cycle until the portable unit sends an ETX or until the fourth ETB is received. If the control unit has determined that a fourth ETB was sent from a portable unit, an error is assumed, the message is not processed, and the portable unit will be placed on the inactive list.

If the message received from the portable unit does not have the correct message number or block check character, the message will not be processed. The portable unit will receive a poll for data signal on the next cycle and will retransmit its last message until it is received correctly up to three times.

A complete sequence between control unit 12 and portable units 14 includes transmission of the addresses (a poll-for-data) of all of the "active" portable units, then a set number of the "inactive" units, followed by all stored messages (selection), or at least one block of each longer message. "Inactive" units are those which have not shown any activity for at least five minutes. All portable unit addresses are maintained in a fixed queue in the control unit 12 but the control unit "tags" each unit as to its current status. In any one polling sequence, the control unit goes down the queue, picking up each "active" unit address in order. Then, again from the queue, picks up four inactive unit addresses, starting at the point in the queue where the inactive section of the last sequence stopped. Thus each inactive unit is polled at less frequent intervals, but not ignored completely. This polling sequence saves time on the radio channel and provides for faster response in both directions in contrast to the type of polling sequence between host computer 10 and control unit 12 where, as previously described, each satellite unit is polled, via the control unit and the computer then waits for two to three seconds for response from the control unit and then goes on to the next address.

"Selection" is a command from the control unit 12 to the portable units to receive data. FIG. 3 depicts the message processing for selection (message relayed from host). This data is typically an answer to a message from the portable unit.

A message from the host computer is taken from the control unit radio queue and sent to the appropriate portable unit. Upon the next poll cycle, the control unit sends an invitation-to-acknowledge to the portable unit. The control unit checks for a response and the type of response (ACK or WACK), the latter meaning "message understood, but am busy now". If an ACK was received, the control unit checks to see if there are more data blocks of the same message still waiting to be sent. If not and there are no other messages waiting to be sent to that unit, on the poll cycle the message is erased in the control unit memory and the portable unit reverts back to the poll-for-data mode.

If the message was longer than 256 bytes, the portable unit receives an ETB signal to signify that more data is to come. Upon the next poll cycle, the next block of data is sent and acknowledged as previously discussed.

If the entire message was sent to the portable unit and there is another message waiting for the same unit, upon the next cycle the new message is sent to the portable unit. If after the message was sent, an invitation-to-ack was sent on the next polling cycle but during the time that the portable unit was still processing the message, the portable unit response would be WACK (wait for acknowledge) to allow the portable unit more time to process the message. Upon receiving a WACK response from the portable unit, the control unit determines whether there is a message pending. If the control unit has more data to send, the control unit repeats the invitation to acknowledge on the next cycle. Again, the message is acknowledged (ACK or WACK) as previously discussed. If there is another WACK response and there is no message pending, on the next poll cycle the message is erased and the portable unit reverts to the poll for data mode.

A condition may arise where there was no response received after the invitation-to-acknowledge was sent or even after the repeat invitation to acknowledge was sent. The control unit must decide if a WACK response was received previously. If it was, then the condition is treated as if has received an ACK response. If a WACK was not received before, the control unit must determine if this is the third attempt to send the message to the portable unit. If it is not, the control unit repeats the message for a second time and, if necessary, for a third time. After the third attempt to send the message to the portable unit, the control unit terminates the message. The portable unit then reverts back to the poll-for-data mode.

Applications

For the purpose of describing the operation of the system, the environment of a large train yard will be used in an exemplary fashion only. Both the master computer and the control unit would probably be placed in an appropriately conditioned room. The base station and antenna would be placed appropriately and a number (up to 32 in the present embodiment) of portable radio/data terminal units would be carried by personnel out in the yard. As a train would enter the yard and pass a given point, the man at that point would read the required data on each car as it passed him, enter the data into his hand-held unit, correct it if necessary, then "arm" the unit. Upon being pulled, the data, or one block of it, would then be transmitted to the control unit. The control unit will identify the sending unit, decode the message and store the data in a "tagged" block of memory. The control unit will then encode and send the data into the host computer on being polled according to the computer protocol. The host computer will process the received data and send back any necessary instructions which are then relayed back to the portable unit in the yard in the same sequence in reverse. The portable unit will store the received message and display it to the man in the yard by alpha-numeric characters on an LED display.

In another possible application of the system of the invention, the personnel might be inventorying a large warehouse. The portable units provide the option of the light pin attachment for reading a black and white bar code such as Code 39.

Data can also be sent from one portable unit to another portable unit without involving the host computer and, as an option, voice communication over a second RF channel can be controlled.

Specific Description

Figure 4:
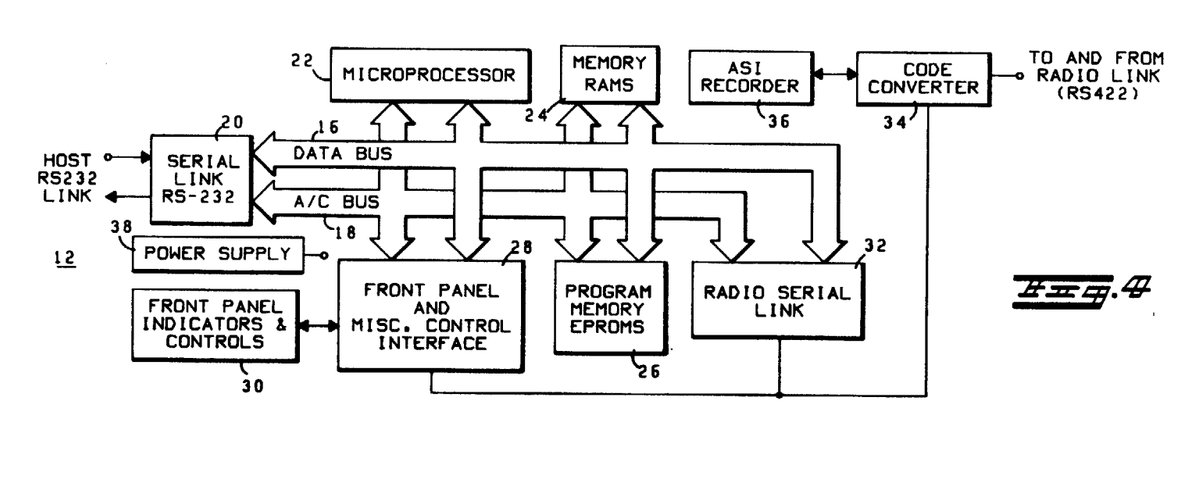
FIG. 4 is a block diagram of a control unit for the system of FIG. 1.

FIG. 4 is a block diagram of the control unit 12 with the major interconnections shown in customary fashion as a data bus 16 and an address/control bus 18. Coupled to the host link of via an RS 232 (MC1488) connection is the serial link, also including an RS 232 connection. A microprocessor 22, is the nucleus of the control unit 12. Coupled to it are RAM memories 24, which provide the ever-changing data storage for the unit. The program is contained in the program memory 26 which is made up of a bank of EPROM's, the preferred embodiment holding up to 16k of memory (16-1k × 8 byte EPROM's). An interface 28 is provided for the front panel and miscellaneous control interface and is coupled to the front panel indicators and controls 30 (see FIG. 7). A radio serial link 32 couples the RF side of the control unit to the code converter 34, and also coupled to the code converter is the automatic station identification (ASI) tape recorder 36. Also indicated is the necessary power supply 38.

Figure 5:
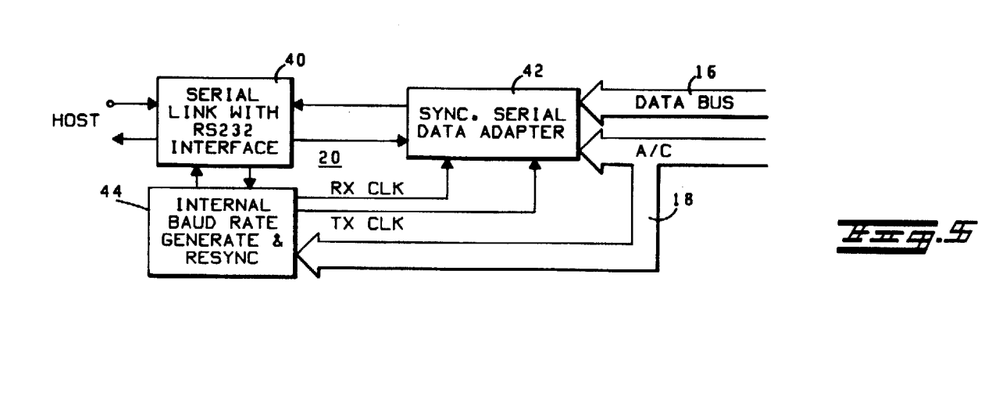
FIG. 5 is a more detailed diagram of the serial link block of FIG. 4.

FIG. 5 is a breakdown of the serial link 20 which couples to the host serial link with the RS-232 interface 40 and includes a synchronous serial data adaptor 42, the preferred embodiment being the Motorola 6852. Also included in the block 20 is an internal Baud rate generator 44 which is coupled to the address/control bus 18 and supplies the receiver clock and transmit clock to the adaptor 42.

Figure 6:
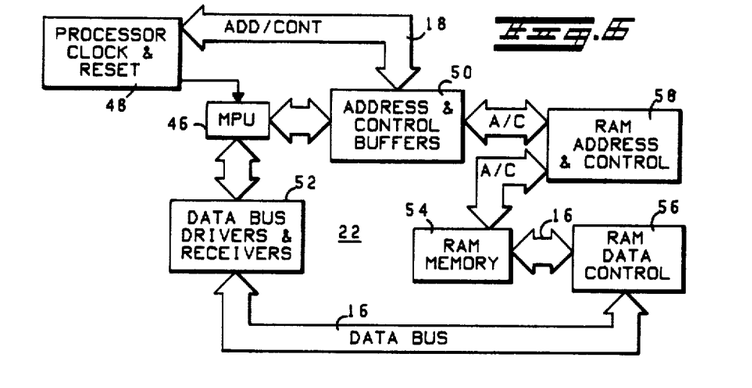
FIG. 6 is a more detailed diagram of the microprocessor block of FIG. 4.

In FIG. 6 the microprocessor block 22 includes a microprocessor 42, the preferred embodiment being the Motorola MC6800 8-bit Microprocessing Unit and its associated buffering and peripheral circuits, and the RAM memory and control. A processor clock and reset block 48, preferably the Motorola MC6875 Synchronous Serial Data Adapter, consists of a power-on-reset pulse generator and a 4 MHZ clock oscillator which is divided down to a two-phase, 1 MHz clock signal for the processor and its peripherals. The pulse generator in the block 48 generates a brief high level signal which clears all peripheral devices and forces the processor to start from the beginning of its program. The block 48 is coupled via the address/control bus 18 to an address and control block 50 which consists of buffers which drive the address lines of all peripheral devices and drives the read/write and valid memory address lines. The microprocessor 46 is coupled to the address and control buffers 50 and also to a data block 52 which includes bidirectional bus drivers and receivers for driving the data bus. This block allows data to be fed into peripheral circuits on a write command from the processor and also allows data to be received from the peripheral circuits on a read command from the processor. The memory portion of the block 22 includes preferably 15k of RAM memory 54 coupled to the RAM address and control block 58 which consists of buffers and decoders which select the various RAM locations depending upon the address. The RAM memory is also coupled to the RAM data block which consists of two-bus transceivers that allow data to be fed into the RAM on a write command from the processors and also allow data to be received from the RAM on a read command from the processor.

Figure 7:
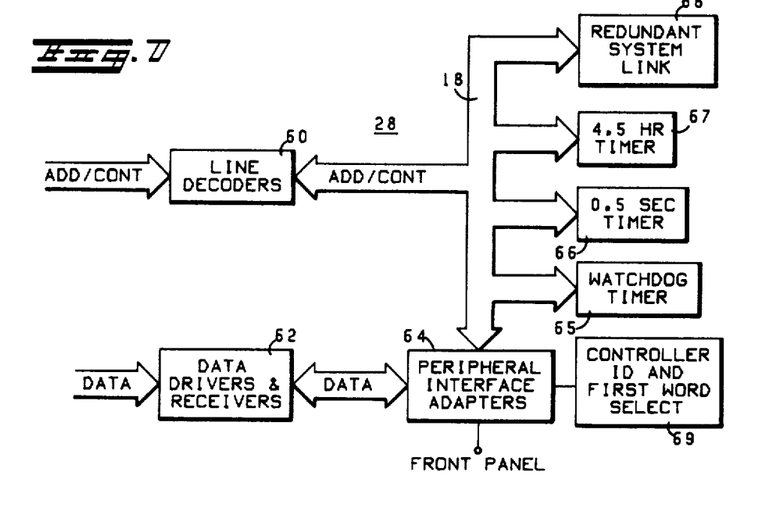
FIG. 7 is a more detailed diagram of the front panel/control interface block of FIG. 4.

FIG. 7 is a block diagram of the front panel and miscellaneous control interface block 28. Block 28 includes line decoders 60 which allow the interface board to respond to the RAM addresses and buffers the reset signals and control signals to and from the peripheral devices. A data block 62 includes the bidirectional bus drivers and receivers for driving the data bus 16. Data and address/controls are coupled to the peripheral devices via peripheral interface adaptors 64, the preferred embodiment being the Motorola MC6820's. Also coupled to the address/control bus 18 are a watchdog timer 65, a 0.5 second timer 66, a 4.5 hour timer 67 and the redundant system link 68. Also coupled to the peripheral interface adaptor 64 are a set of jumpers which include the controller ID select and first word select 69.

Figure 8:
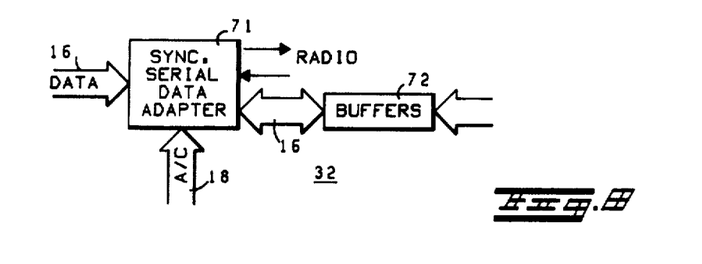
FIG. 8 is a more detailed diagram of the radio serial link block of FIG. 4.

The radio serial link block 32 of FIG. 4, is further detailed in FIG. 8 as including a synchronous serial data adaptor 71, preferably a Motorola MC6852, coupled to the data block 16 and address/control bus 18, to the radio link (via code converter 34) and to buffers 72.

Figures 9, 10:
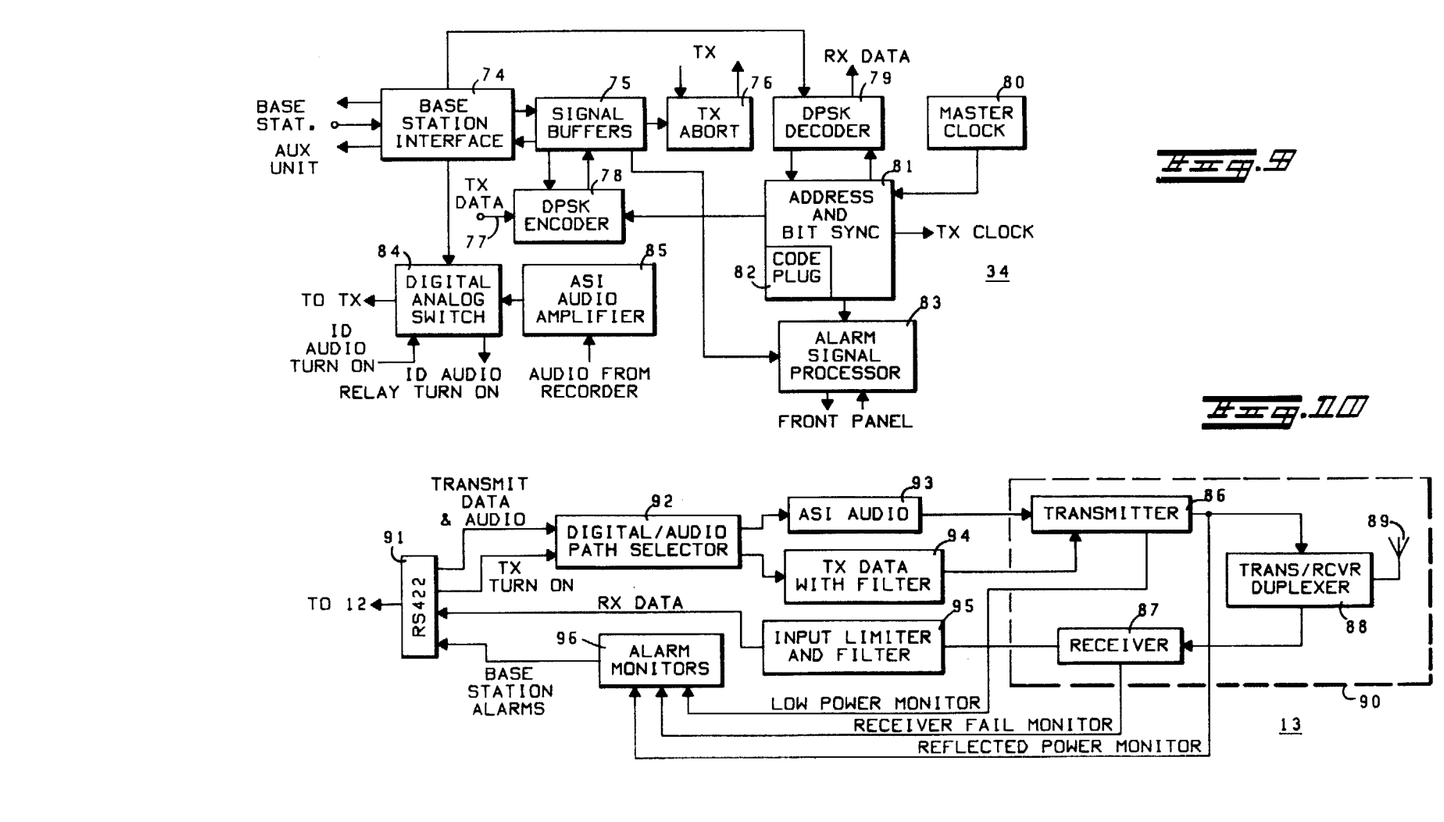
FIG. 9 is a block diagram of the code converter block of FIG. 4.
FIG. 10 is a block diagram of a base station of the system of FIG. 1.

FIG. 9 is a block diagram of the code converter block 34 of FIG. 4. The code converter 34 provides the interface between the base station 13 and the microprocessor 22. A base station interface block 74 consists of RS 422 differential drivers and receivers, which allow cables up to one mile (1.8 km) to be used between the base station and the control unit. These may be embodied by Motorola the MC3486 and MC3487 (quad RS-422 line receiver and driver), and are coupled through signal buffers 75 to the transmitter through a transmit abort block 76, the transmit abort function having been described hereinabove. Data to be transmitted enters the block 34 at the point 77 and is encoded in the differential phase shift keying encoder block 78, which consists of a JK flip-flop and an EXOR gate. Data received from the base station via the interface 74 is coupled to the DPSK decoder 79 which delays the received data signal 1 bit in time through a 186-bit shift register. The delayed signal is exclusive ORed with the non-delayed signal, yielding the base baud data. This signal is processed and sent to the microprocessor 46. The master clock 80 sets the overall clock rate for the system. An address and bit sync block 81 includes a code plug 82 and serves, as shown in the prior art, to detect the address signal and establish the bit sync for subsequent data. An alarm signal processor 83 receives alarm signals from all the base major and base minor lines (see FIG. 10), couples them to the microprocessor and to the front panel indicators. The base station interface 74 is also coupled to a digital/analog switch circuit 84 as is the automatic station identification audio amplifier 85. As required by the FCC, an audio identification signal must be sent every 15 minutes on such transmissions, and this is supplied from the recorder 36. The automatic ID turn on and automatic ID relay turn on connections are made to the digital/analog switch 84 and the output is coupled to the transmitter in the base station 13.

FIG. 10 shows the base station 13 with an FM transmitter 86 and receiver 87, duplexer 88 and antenna 89 inside a dashed line 90, and could be any suitable two-way base station. Inputs to the transmitter 86 come from the control unit 12 via an RS 422 link 91 and include the transmit data and audio signal and transmitter turn on signal which are coupled through a digital/audio path selector 92, the automatic station identification signals taking precedent as required by law. ASI signals are processed in the audio circuit 93 and the data signals through a data circuit 94 including filters. Signals received at the antenna 89 are detected in receiver 87 and coupled through limiter/filter 95 back through the RS 422 link 91. Also coupled back to the control unit 12 on the link 91 are the base station alarms which have been processed in the alarm monitor block 96 and include a low power monitor signal from the transmitter 86, a receiver fail alarm signal from the receiver 87, and the reflected power alarm signal from the output of the transmitter.

Figure 11:
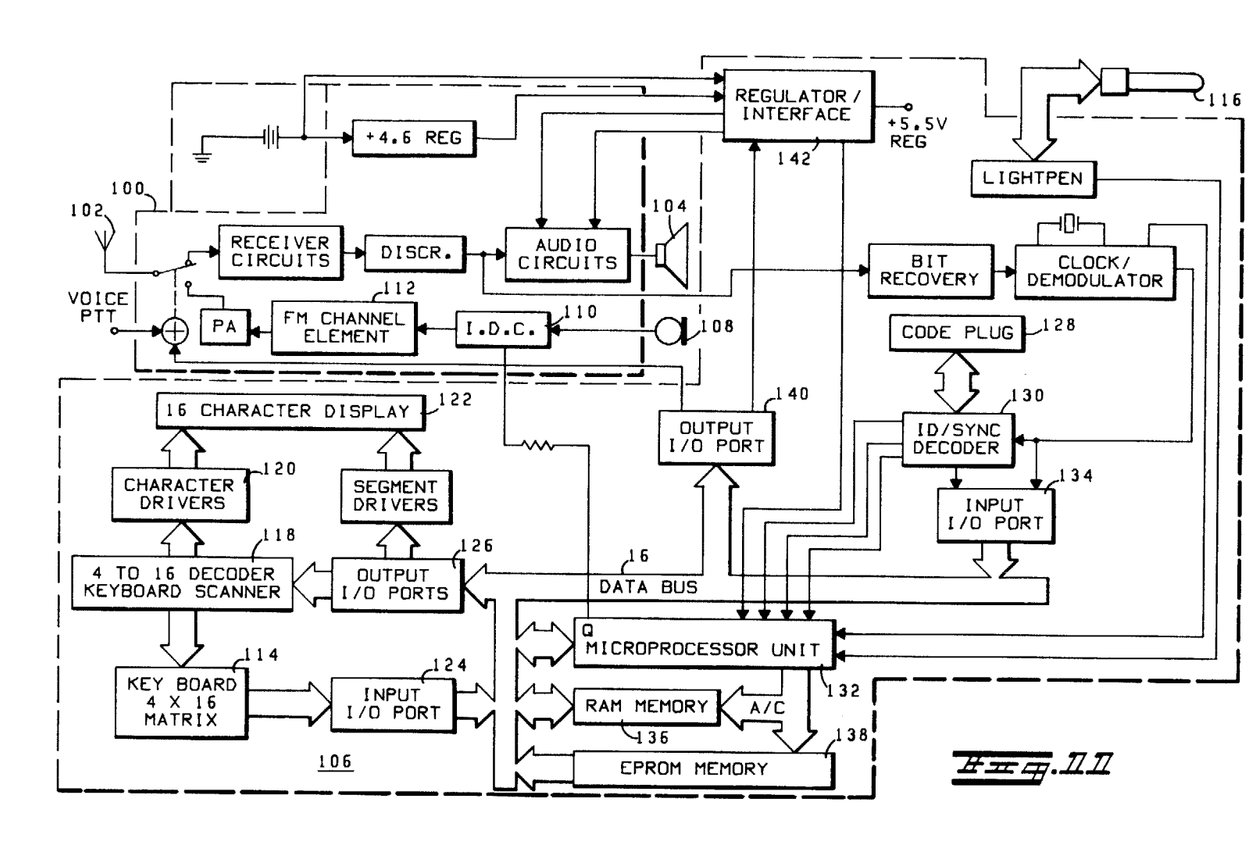
FIG. 11 is a block diagram of a portable unit of the system of FIG. 1.

FIG. 11 is a block diagram of one of the portable radio/data terminals 14 as used in the system. Radio block 100 includes a common antenna 102 coupled through a PTT switch (normally receive) to the receiver and transmitter portions. The input signal is mixed, detected, amplified and filtered to produce a desired audio response characteristic. Any voice signals are coupled to a speaker 104 and data signals are coupled to the data terminal 106. Data initiated by the data terminal 106 or voice signals from the microphone 108 are coupled to an instantaneous deviation control (IDC) 110, which shapes, filters, and limits the signals which are then applied to the transmitter channel element 112 for modulating the RF signal to be transmitted.

Data inputs to the terminal 106 include a keyboard 114 and a light pen 116. The keyboard 114 is a 4×16 matrix whereby the user of the radio/data terminal can enter, modify or erase input data as desired. Keyboard inputs are scanned by the keyboard scanner 118 and coupled to character drivers 120 for read-out by the display which is preferably a 16 character LED display 122. Inputs from the keyboard 114 are also coupled to an input port 124 and onto the data bus 16. Received data comes from the data bus 16 to output port 126 for read-out on the display 122. Stored in a code plug 128 is the unique binary coded address of the particular data terminal unit 14. As disclosed in the above referenced prior art, the address is coupled to the ID/sync decoder hybrid module 130 for detecting the address of the unit 14 in a received data bit stream. The module 130 supplies a power reset, a sync signal and clock signals to a microprocessor 132. Received data is coupled to an input port 134 and coupled to the microprocessor 132, to RAM memory 136 and, through output port 126 to the display 122. Control information on the received signal is coupled from the microprocessor 132 via the address bus 18 to the RAM memory 136 and an EPROM memory 138 for control of the data processing in the unit. Locally generated data, such as from the keyboard is also outputted to output port 140 to control the PTT switch and to a regulator/interface hybrid module 142 to signal the squelch circuits and alert circuits that a message for that particular unit has been received. The regulator/interface 142 also monitors the battery supply and when the supply is low enough that data resulting in incorrect data could be processed, a signal is addressed to the microprocessor 132, resulting in a canned message reading "low battery" on the display 122.

Redundant Operation

Each control unit 12 includes a "watchdog" or "deadman" timer 65 (FIG. 7) which monitors the microprocessor 46 (FIG. 6), as is known, to determine that the microprocessor is functioning properly and is not "lost" in the program. The timer pulse, which is a one-half second period pulse in this embodiment, is coupled to a one-shot in the timer 65 to keep the timer blocked. If the one-shot does not receive the pulse, indicating that the microprocessor 46 is faulty, the microprocessor LED on the front panel is lighted. The pulse is also coupled to the redundant control unit 12' and will activate that unit immediately upon failure of the operating control unit. Another 0.5 second pulse is sent from the redundant unit to the operating unit, and failure of the redundant unit while inactive will cause the operating unit to remain operative beyond the normal 4.5 hour switchover time, and until the redundant unit is functional again. If both units are functional, a controlled switchover (CSO) occurs every 4.5 hours, wherein the "on" unit stops accepting messages, completes the transmission of all stored messages, performs a "quickie" test of its RAM's and EPROM's, then goes off and causes the "off" unit to come on. If the quickie test shows any memory problems in the first unit, the second unit will stay on pass the 4.5 hour period unless it receives an indication that the first unit is functional again at that time.

Self-Diagnostic Operation

At turn on of the control unit 12, a "quickie" test of the RAM's and EPROM's is performed to be sure that there is enough RAM memory for proper functioning and to verify programming, etc. in the EPROM's. Similar tests have been incorporated into prior art devices. In case of a major failure indication on the operating unit front panel, with switchover if there is a redundant system, service personnel can cause the "down" unit to perform a self test to determine the problem. An extensive check out has been programmed into the system, so that by disconnecting the control unit 12 from the base station 13 cables, host computer 10 cables and the redundant control unit 12' cable and making the proper interconnections, all major blocks of circuitry are checked out, including all timers and all interrupt toggles.

Any faulty block is indicated by the appropriate LED on the front panel, and after the faulty block is replaced, the interconnecting cables are attached as before. The interconnections mentioned above serve to allow the control unit to "talk to itself"; i.e., the signal normally coupled to the transmitter is coupled back to the input from the receiver. The output which would normally turn on the transmitter is coupled back to the input terminal from the base station which would normally indicate a major fault in the base station.

Thus it has been shown and described an RF-linked communication system which interfaces with a host computer and includes multiple portable radio/data terminals, a control unit and a base station. The control unit receives transmission signals from both the computer and all of the portable units, decodes, stores, processes and encodes the signals for communicating between the units. It will be apparent to one skilled in the art that various modifications and variations of this system according to the invention are possible and is intended to include all those which are covered by the appended claims.

What is claimed is:

1. A communication system for use with a computer and comprising a control unit, a base station, and a plurality of portable units, each portable unit having a unique address code and including means for receiving intelligence signals, means for transmitting intelligence signals in response to a command from the control unit, means for manually generating intelligence signals, means for storing said received signals and said manually generated signals, means for automatically generating status signals, means for detecting the respective address code in the received signals, means for responding to detection of the address code with one of the manually generated signals and status signals, the base station including means for two-way RF communication with the portable unit, and means for coupling intelligence signals to and from the control unit, the control unit having at least one unique address code and including means for coupling information signals to and from the base station for the portable units, means for coupling information signals to and from the computer, means for detecting the respective address code in received signals, means for decoding signals from the computer, means for encoding said signals for the portable units, means for decoding signals from the portable units, means for encoding said signals for the computer, memory means for storing the encoded signals in accordance with the respective destinations of the signals, means for establishing a queue of portable unit address codes, means responsive to the status signals received from each portable unit for establishing a sequence of transmissions to the portable units in accordance with said queue and said status signals.

2. An communication system in accordance to claim 1 and further including a second control unit and second transceiver means, and further including in each control unit for providing a signal and utilizing said signal for checking the functional status of the control means, and means for coupling said signal to the other of said control units, and means responsive to the lack of reception of said signal for activating said other control means.

3. An communication system in accordance with claim 1 wherein the control means is coupled to the Host Computer by a direct wire link.

4. An communication system in accordance with claim 1 wherein the control means is coupled to the Host Computer via a cable and modem link.

5. An communication system in accordance with claim 1 wherein the means for generating information signals in one of the portable radio/data terminal units includes an alpha-numeric keyboard.

6. An communication system in accordance with claim 1, wherein the means for generating information signals includes means of reading bar codes.

7. An communication system in accordance with claim 1 and further including in at least some of the portable units, a microphone and means for sending and transmitting audio information on a separate channel.

8. An communication system in accordance with claim 1 wherein the second decoding means in the control unit for decoding signals from the portable units further includes means for encoding predetermined ones of said signals for transmission to others of said portable units.

9. An communication system in accordance with claim 1 wherein the second decoding means in the control unit for decoding signals from the portable units includes means for returning certain predetermined signals to the transmitting portable unit for checking of the radio transmission therebetween.

10. An communication system in accordance with claim 1 wherein the control unit includes means for accepting and transmitting data at the respective data rates of the computer and the portable units.

11. An communication system in accordance with claim 1 wherein each unique address code consists of two binary coded words and wherein each of the address detecting means of the portable units and of the control means includes means for detecting the complements of each respective address word, and wherein said appropriate responses are arrangements of said address words and complement words.

12. A communication system in accordance with claim 1 wherein the means for automatically generating status signals in a portable unit generates a first status signal when the said portable unit has transmitted or received intelligence signals within a predetermined prior period of time, and a second status signal if no transmission or reception has occurred with said period.

* * * * *

UNITED STATES PATENT AND TRADEMARK OFFICE
CERTIFICATE OF CORRECTION

PATENT NO. : 4,247,908
DATED : January 27, 1981
INVENTOR(S) : Robert K. Lockhart, Jr., William J. Macko, Robert H. Bass, Craig S. Wallace & Morris A. Moore It is certified that error appears in the above—identified patent and that said Letters Patent is hereby corrected as shown below:

On the Title Page in the title of the invention, Item [54], delete "RE-LINKED" and substitute --RF-LINKED--.

In Column 1, line 1, delete "RE-LINKED" and substitute --RF-LINKED--.

In Column 7, line 32, delete "of".

Signed and Sealed this

Twenty-eighth Day of July 1981

[SEAL]

Attest:

Attesting Officer

GERALD J. MOSSINGHOFF

Commissioner of Patents and Trademarks